July 1, 1969 J. J. C. VANDERSTEEN 3,453,159

METHOD FOR ETCHING A SPIRAL GROOVE PATTERN
WITH USE OF A MASKING APPARATUS
Filed March 23, 1966

INVENTOR.
JACOBUS J.C.VANDERSTEEN
BY
Frank R. Trifari
AGENT

United States Patent Office 3,453,159

Patented July 1, 1969

3,453,159
METHOD FOR ETCHING A SPIRAL GROOVE PATTERN WITH USE OF A MASKING APPARATUS

Jacobus Johannes Cornelius Vandersteen, Emmasingel, Eindhoven, Netherlands, assignor, by mesne assignments, to U.S. Philips Corporation, New York, N.Y., a corporation of Delaware Filed Mar. 23, 1966, Ser. No. 536,725
Claims priority, application Netherlands, Apr. 3, 1965, 6504265
Int. Cl. C23f *1/02;* G03c *5/00*
U.S. Cl. 156—8 4 Claims

ABSTRACT OF THE DISCLOSURE

A method of forming a conical spiral groove pattern upon at least one cooperating part of a bearing element by use of a masking jig. The method includes, coating the surface of the part with a photosensitive lacquer, overlaying the coated surface with a jig having a conical surface provided with the spiral groove pattern to be produced, exposing said lacquer to light passing through said jig to form the pattern upon the part, removing the jig and etching the coated part to obtain the spiral groove pattern.

This invention relates to a method of providing a groove pattern on one of the two cooperating parts of a spiral groove bearing by utilizing a photochemical etching process.

Spiral groove bearings consist of a compression element and a supporting element, the cooperating surfaces of which are rotationally-symmetric, and a pattern of regularly divided shallow grooves are provided in one of the said elements. The center lines of the said grooves define a spiral. When the compression element rotates a lubricant is pressurized by the grooves and the bearing is lubricated hydrodynamically. Such bearings have a very high bearing capacity and low friction.

It is known to provide a groove pattern, for example, in a flat bearing surface by exposing light to this surface, which has previously been provided with a photosensitive layer of lacquer, through a photo-negative overlay. The exposed part of the layer of lacquer hardens while the unexposed part, which has the shape of the grooves to be provided, can be removed. The hardened lacquer layer thus forms a mask on the bearing member in question. The desired groove pattern is obtained by subjecting the unexposed part of the bearing to the action of an etchant.

If, however, it is desired to provide a conical bearing member with spiral grooves, difficulties present themselves in connection with the provision of the groove pattern in the lacquer layer, especially in mass production of such bearings at reasonable expense.

It is the object of the invention to provide a method in which mass manufacture of conical spiral groove bearings is effectively and economically possible. For this purpose, according to the invention, a photosensitive lacquer layer is provided on one of the cooperating conical parts of the spiral groove bearings to be formed and a jig, which is provided with a conical surface, is then positioned with its surface against the part of the conical bearing provided with the lacquer layer.

The jig may be constructed in many ways, for example, it may consist partly of light-pervious and partly of light-impervious synthetic material. Preferably, however, the jig according to the invention consists of a rod of a light-pervious synthetic material which is provided with a surface having the desired conoid, a photonegative with the image of the developed view of the desired groove pattern being permanently secured against said surface. When the photonegative is provided in the conical shape, it easily engages the lacquer layer in a light-impervious manner and does not damage the said layer when the jig is provided or removed. In addition it is simple in this construction, to provide a very fine groove pattern, in particular if the photonegative is manufactured according to the known Dippel process.

In order that the invention may readily be carried into effect it will now be described in greater detail, by way of example, with reference to the accompanying drawing, in which.

Figure 1:
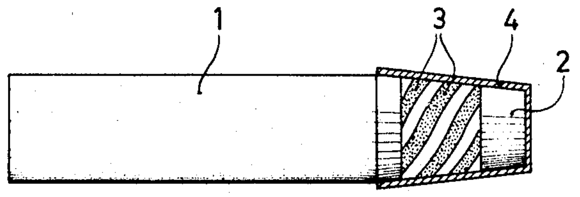
FIG. 1 shows a shaft having a conical part to be provided with grooves.

With reference to the drawing, the manufacture will be described of a spiral groove bearing having a grooved conical part of the shaft. It will be apparent also that the groove can alternatively be provided in the part of the bearing having the conical aperture.

The shaft 1 shown in FIG. 1 comprises a conical part 2 in which shallow grooves 3, for example, having a depth of from 1 to 2 microns, must be provided. The grooved conical part 2 is adapted to cooperate with a supporting bearing element (not shown) which is provided with a conical aperture. In this manner a known conical spiral groove bearing is obtained.

Figure 2:
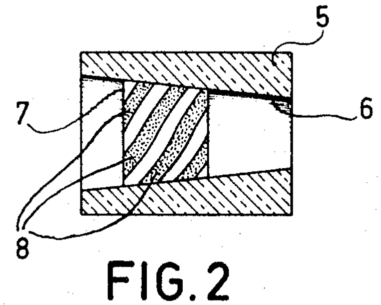
FIG. 2 shows a jig to be used in providing the groove pattern in the shaft shown in FIG. 1.

To manufacture the grooves, the conical part 2 is provided with a photosensitive lacquer layer 4. The jig 5 shown in FIG. 2, is then provided on the conical part 2 of the shaft. Said jig 5 consists of a rod of transparent synthetic material in which an aperture 6 is provided having the same conoid as the part 2 of the shaft 1. A photonegative 7 is secured in the aperture 6, for example, by means of a transparent glue. The negative 7 is obtained by photographing a developed view of the desired groove pattern. The parts of the negative 7 corresponding to the grooves to be formed are denoted by 8. The assembly is then exposed to light energy, the parts of the lacquer layer on the shaft 1 where no grooves are to be provided is exposed to the light, whereas the parts where the grooves are to be formed is covered with the light-impervious black pattern of the negative 7. The jig is then removed. The exposed part of the lacquer layer hardens, the unexposed part can now be removed. The lacquer layer forms a mask on the conical part 2 of the shaft 1. By subjecting said conical part and mask assembly to the action of an etching liquid, grooves are provided in the material of the shaft to a desired depth. The protecting lacquer layer can then be removed by any suitable known means.

The use of the transparent jig with the photonegative secured therein has a number of advantages. The assembly can be manufactured in a simple manner. The negative readily engages the lacquer layer on the shaft to be grooved without damaging said layer when the jig is applied or removed, while a complete light-impervious engagement is obtained. In addition, when using a photonegative, it is possible in a simple manner to provide a fine pattern of grooves, so that shafts having a diameter of, for example, less than 5 mm. can easily be provided with grooves. The photonegative further is entirely smooth as a result of which the surface treatment of the aperture in the jig need not fulfill high requirements. Further, the jig can be utilized again and again.

Figure 3:
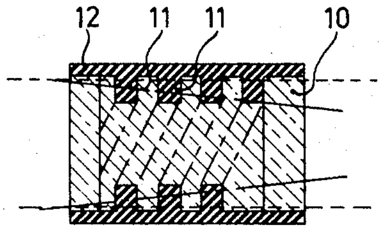
FIGS. 3 and 4 show a further embodiment of the jig.
Figure 4:
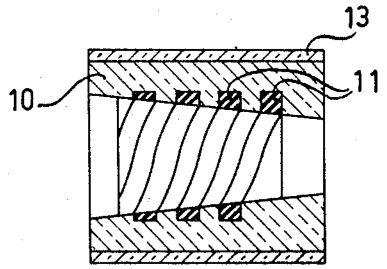

The jig may alternatively be constructed in a different manner. FIGS. 3 and 4 show an embodiment of such a jig. FIG. 3 shows a rod 10 of a transparent synthetic material having rectangular grooves 11, the inside diameter of which is smaller than the largest diameter of the grooves to be provided in the conical part of the bearing shaft. The rod 10 is then encapsulated with a liquid blackened synthetic material 12, the synthetic material penetrating into the grooves 11. After hardening the assembly is turned down in the form of a cylindrical rod, for example, to the broken lines in FIG. 3, a part of the grooves being cut away as a consequence. The assembly or cylindrical rod of FIG. 3, is then placed in a transparent sheath 13 which is filled with a transparent, liquid-hardening synthetic material to obtain a jig which has sufficient rigidity for frequent use. The conical aperture is then drilled by means of a profiled drill and a jig is obtained as shown in FIG. 4. The light-impervious parts of the jig correspond to the groove pattern to be formed.

Conical spiral groove bearings can be provided in a simple and inexpensive manner by means of the method according to the invention.

What is claimed:

1. A method of providing a groove pattern on one of the two cooperating parts of a conical spiral groove bearing by means of a photochemical etching process, comprising the steps of coating one of the cooperating conical parts of the bearing to be formed with a photosensitive lacquer, overlying this coating with a jig having a conical surface which is adapted to receive the surface of the bearing part provided with the lacquer layer, said jig comprising a light-pervious material having on said surface a partially light-pervious partially light-impervious pattern in the form of the groove pattern to be produced, exposing said photosensitive lacquer layer to light passing through said jig, removing said jig, and etching said coated surface.

2. A method according to claim 1, wherein the groove pattern is provided on a conical part of a bearing shaft, said jig having a conical aperture, said conical aperture having a partially light-pervious, partially light-impervious spiral pattern corresponding to the groove pattern to be provided.

3. A jig for carrying out the method according to claim 1 comprising a rod of light-pervious material, said rod having a conoid surface of desired dimensions, a photonegative having the image of a developed groove pattern, said photonegative being permanently secured on said surface.

4. A jig according to claim 1 in which said rod has a conical aperture in which said photonegative is secured by means of a light-pervious glue.

References Cited

UNITED STATES PATENTS

| | | | |
|---|---|---|---|
| 2,918,358 | 12/1959 | Iversen | 156—13 |
| 3,197,390 | 7/1965 | Mears | 156—3 XR |
| 3,249,478 | 5/1966 | Brevik | 156—6 XR |

FOREIGN PATENTS

| | | |
|---|---|---|
| 3,355 | 7/1915 | Great Britain. |
| 874,053 | 8/1961 | Great Britain. |

ROBERT F. BURNETT, *Primary Examiner.*

W. A. POWELL, *Assistant Examiner.*

U.S. Cl. X.R.

96—35, 44; 156—16